United States Patent
Ephrat et al.

(10) Patent No.: US 7,201,180 B2
(45) Date of Patent: Apr. 10, 2007

(54) WATER SUPPLY SYSTEM

(75) Inventors: Uri Ephrat, Givat Ela (IL); Abraham Gleichman, MaAlot Tarshiha (IL)

(73) Assignee: Optimus Water Technologies Ltd., MaAlot Tarshiha (IL)

( * ) Notice: Subject to any disclaimer, the term of this patent is extended or adjusted under 35 U.S.C. 154(b) by 355 days.

(21) Appl. No.: 10/498,834

(22) PCT Filed: Dec. 19, 2002

(86) PCT No.: PCT/IL02/01023

§ 371 (c)(1),
(2), (4) Date: Jun. 14, 2004

(87) PCT Pub. No.: WO03/057998

PCT Pub. Date: Jul. 17, 2003

(65) Prior Publication Data

US 2005/0016593 A1    Jan. 27, 2005

(30) Foreign Application Priority Data

Jan. 8, 2002    (IL) ...................................... 147506

(51) Int. Cl.
   *G05D 16/20*    (2006.01)
(52) U.S. Cl. ...................... 137/14; 137/487.5; 137/488; 251/29; 251/30.01
(58) Field of Classification Search ................ 137/14, 137/12, 487.5, 488; 251/29, 30.01
See application file for complete search history.

(56) References Cited

U.S. PATENT DOCUMENTS 4,200,911 A * 4/1980 Matsumoto ................. 700/28
4,364,408 A    12/1982 Griswold
4,562,552 A    12/1985 Miyaoka
5,460,196 A * 10/1995 Yonnet ........................ 137/12
5,660,198 A *  8/1997 McClaran .................... 137/12
6,112,137 A *  8/2000 McCarty et al. ............ 700/301

FOREIGN PATENT DOCUMENTS

EP      1 126 089 A2      8/2001
JP       11256624 A   *  9/1999
JP      2001280597 A  * 10/2001

OTHER PUBLICATIONS

Christine Chan, Development of an Intelligent Control System for a Municipal Water Distribution Network, 1999 IEEE Canadian Conference on Electrical and Computer Engineering.

* cited by examiner

*Primary Examiner*—Ramesh Krishnamurthy
(74) *Attorney, Agent, or Firm*—The Nath Law Group; Jerald L. Meyer; Derek Richmond

(57) ABSTRACT

A water supply system comprising a supply line and a network of consumers, one of which being a monitored consumer who receives the least amount of pressure, a pressure regulation system comprising a pressure reducing valve (PRV) associated with a pilot valve preset to a nominal output pressure and a pressure control system comprising a differential control valve (DCV). A pickup unit is provided for measuring a flow parameter indicative of the pressure at the monitored consumer and emitting a pressure signal to a controller generating in turn a control signal responsive to the pressure signal to activate an actuator of the DCV thereby governing the flow rate through the DCV, so as to obtain desired pressure at the monitored consumer, regardless of altering flow rate through the PRV.

21 Claims, 9 Drawing Sheets

WATER SUPPLY SYSTEM

FIELD OF THE INVENTION

The present invention is generally in the field of water flow and pressure control. More particularly the invention is concerned with a control system for a network of water supply. The invention is also concerned with a device used with the system and with a water control method.

BACKGROUND OF THE INVENTION

A water supply system, e.g. a municipal water system, typically comprises a main supply line fed from a source of water (water reservoir, well, lake, etc.) and pumping means for propelling the water through a network of pipes so it can reach various consumers downstream.

Typically, there are also provided various pressure regulating and control means along the pipe's network in order to monitor the water flow and to reduce pressure of water to such a level that will, on the one hand, ensure proper functioning of various systems which are pressure activated, e.g. irrigation systems valving means, etc. and, on the other hand, will not damage any end equipment of the consumers by excessive pressure, e.g. burst of pipes, damage of solar heaters, and other domestic equipment connected to the water network (dishwashers, washing machines, etc.). Excessive pressure may also be harmful for industrial facilities receiving water from the network.

Hereinafter in the specification and claims the term "pipe network" refers to the piping and installations extending from the water source to the consumers.

The consumers of a water supply system may be for example domestic consumers, industrial facilities, public and municipal facilities, agricultural consumers, etc., all of which being referred to herein in the specification and claims collectively as a "network of consumers".

Among the network of consumers there is at least one consumer at a location where the measured pressure is lower than the pressure measured at the other consumer sites. Such a consumer may be for example a remote one whereby pressure loss occurs owing to flow through a long and branching pipeline (friction and head loss), or a consumer at an elevated location (high building or on a mountain) etc.

Hereinafter in the specification and claims, the one or more consumer at which lowest pressure is measured is referred to as a "monitored consumer" (also known as a "critical consumer").

Water consumption in a municipal water supply system varies throughout the day. Increased consumption is typically measured at the morning hours (between about 6 and 9 a.m.) and again in the evening hours (between about 7 and 9 p.m.). However, these peaks are subject to changes, e.g. at weekends, upon setting of DST, season changes, major events such as an important sports match, etc.

It is the concern of the water supplying authority, for example a municipality or a water supplying company, that the monitored consumer receives water at a minimal pressure, say for example, about 2½ atmospheres so as to ensure proper functioning of various pressure activated equipment and to enjoy reasonable pressure at a domestic water facilities, e.g. taps, showers, etc. Increasing the pressure at the monitored consumer will necessarily entail a much more significant pressure increase at consumers upstream, even as much as harmful over pressure.

For one thing, over pressure demands more powerful pumping units and is more costly. Second, it requires a pipe network that can withstand such overpressure. Then there is a problem of over pressure which can cause damage to the consumers as already mentioned above.

Even more so, non-significant leaks in the pipe network, e.g. minor holes or poor connections of piping elements, become proportionally significant upon pressure increase and may be the reason for some significant loss of fresh water which goes astray. Reports show that rates of loss of fresh water by leaks reach as much as about 15 to 40% of a supplier's flow delivery.

A variety of water pressure and control systems are known. A basic arrangement comprises a pressure reducing valve (PRV) which functions to reduce pressure between an inlet and an outlet thereof, regardless of flow changes through the device or change of pressure upstream. Several such PRVs are typically fitted along a pipe network, e.g. at branchings to suburbs, adjacent major consuming facilities, buildings, etc.

A typical PRV comprises an inlet port being in flow communication with an outlet port via a flow passage governed by a pressure control chamber. When the pressure control chamber is pressurized, the flow passage is restricted to thereby restrict flow between the inlet and the outlet port so as to obtain essentially constant outlet pressure.

Pressure within the control chamber is governed by various flow control means which eventually serve for the purpose of controlling the water flow rate through the control chamber.

In accordance with one prior art embodiment there is provided a so-called hydraulic valve, wherein the pressure chamber is charged by a restriction orifice having a constant inlet flow rate $Q_1$ connected upstream of the PRV and is discharged by a pilot valve having a set nominal outlet flow $Q_2$ connected downstream of said PRV. When $Q_1$ is greater than $Q_2$ the pressure within the pressurized control chamber increases to thereby restrict (or close) the flow passage between the inlet port and the outlet port of the PRV to thereby restrict the outlet flow $Q_{out}$ of the PRV, entailing a corresponding drop in out let pressure $P_{out}$ of the PRV.

In accordance with a different arrangement, rather than the restriction orifice and the pilot valve, there are provided solenoids (optionally proportional solenoids) connected to electric controllers, whereby water inlet flow $Q_1$ and outlet flow $Q_2$ are controlled to thereby govern pressure within the control chamber.

In accordance with still a different embodiment a bias chamber is fitted onto a plunger of the pilot valve for hydraulically activating an internal diaphragm of the pilot valve. Said bias chamber is connected to an upstream water supply whereby a plunger of the pilot valve is displaceable to restrict the outlet flow $Q_2$ of the pilot valve.

Still another control system is concerned with fitting a bias chamber onto an adjusting member of a pilot valve supply whereby the adjusting member of the pilot valve is displaceable so as to restrict the outlet flow $Q_2$ of the pilot valve.

In accordance with an embodiment of the above solution, there is provided a bias chamber integrally fitted with the pilot valve. Nevertheless, control solenoids are still required for restricting the inlet flow $Q_1$ and the outlet flow $Q_2$.

Each of the above control systems have at least one of several deficiencies and drawbacks as follows:
  i. Malfunctioning of one or both the solenoids renders the PRV inactive. This may result in one of two undesired extreme positions, the first being complete cut-off of the water supply and the second being providing the consumers with a pressure which is equal to high pressure upstream (as the PRV does not fulfil its function) whereby the water supplier is exposed to malfunctioning liability owing to damages caused to consumers.

ii. Every recognizable pressure or flow change entails activation of the solenoids whereby an associated power source is rapidly exhausted;

iii. Increased openings/closing of the solenoids and valve components may render the system vulnerable to malfunction.

iv. Usage of solenoids requires filtration of the water at a high level (typically as much as microns). Thus increased maintenance is expected.

v. An important factor is the option to install the control system in retrofit. In most cases individual fittings and installations are required which render the installation not cost effective.

vi. At low flow rates the system enters a so called hunting state where the system is unsuccessful in reaching a steady state.

vii. The bias chamber is a sensitive element requiring fine adjustments and being susceptible to dirt.

viii. The systems does not offer any bypassing arrangements, whereby malfunctioning of such a system may result in that the consumer will receive excessively high pressure, which may cause damage.

It is thus an objection of the present invention to provide a water supply control system capable of providing essentially desired pressure at the monitored consumer regardless changes in consumption, i.e. flow rate through the system. A water supply system in accordance with the invention provides for essentially constant pressure measured at the monitored consumer regardless of its location and head loss in the piping network and also regardless of sudden changes in consumption or periodic such changes.

In accordance with another aspect of the present invention there is provided a differential control valve useful in obtaining a constant flow rate in spite of pressure changes in the line by eliminating such pressure alterations.

Still a further object of the present invention is to provide a method for controlling pressure at a water supply system so as to provide desired pressure at a monitored consumer.

SUMMARY OF THE INVENTION

The present invention calls for a water supply system comprising a network of consumers and a pressure regulating system which in spite of alternating flow rate through the system maintains the pressure at the monitored consumer at a desired pressure level.

In accordance with one aspect of the invention there is provided a water supply system comprising a supply line and a network of consumers, one of which being a monitored consumer who receives the least amount of pressure, a pressure regulation system comprising a pressure reducing valve (PRV) associated with a pilot valve preset to a nominal output pressure; and a pressure control system comprising a differential control valve (DCV); a pickup unit for measuring a flow parameter indicative of the pressure at the monitored consumer and emitting a pressure signal to a controller; said controller generating a control signal responsive to the pressure signal to activate an actuator of the DCV thereby governing the flow rate through the DCV, so as to obtain desired pressure at the monitored consumer, regardless of altering flow rate through the PRV.

In accordance with one embodiment, the flow parameter is flow rate measured adjacent the PRV and converted into a pressure signal representative of the pressure at the monitored consumer, based on conversion calculations. And in accordance with another embodiment the flow parameter is pressure measured at the monitored consumer.

Where the flow parameter is flow rate, there is typically provided a pressure pickup for reading pressure at an outlet line of the DCV to generate a local pressure signal, whereby said local pressure signal and the pressure signal are compared at the controller.

In accordance with still another embodiment, the water supply system further comprises a bypass gate for overriding the DCV in case malfunction of the DCV and/or of the controller is detected (including any control parameters e.g. software problems, control signal errors etc.).

In accordance with a different aspect of the present invention, there is provided a differential control valve useful in a pressure control system in accordance with the present invention. The differential control valve comprises:

a housing fitted with a static inlet, a dynamic inlet and a valve outlet;

a control chamber sealingly partitioned by a flexible diaphragm dividing the chamber into an a first chamber communicating with the static inlet, and a second chamber communicating with the valve outlet and with a controlled flow passage serving to effect communication between said second chamber and said dynamic inlet;

a spring loaded obturating member articulated with the diaphragm and being axially displaceable within the controlled flow passage responsive to differential pressure displacement of the flexible diaphragm;

and a controlled actuator for axially displacing the obturating member thereby to govern flow through the controlled flow passage responsive to differential pressure over the flexible diaphragm and an opposing force imparted by the actuator and the spring.

In accordance with one particular embodiment of the differential control valve the obturating member is a needle-type sealing member fitted for sealing engagement with a corresponding sealing seat of the flow passage; said sealing member and sealing seat being essentially equally tapered and where cross-sectional flow area between the sealing seat and the sealing member is proportional with respect to axial displacement of the sealing member.

The invention is further concerned with a method for controlling pressure at water supply system comprising a supply line and a network of consumers, one of which being a monitored consumer who receives the least amount of pressure; a pressure regulation system comprising a pressure reducing valve (PRV) fitted with a pilot valve preset to a nominal output pressure, a pressure control system comprising a differential control valve (DCV) connected in series to said pilot valve, a flow parameter pickup unit and a controller;

the method comprising the following steps:

(i) measuring a flow parameter indicative of the pressure at the monitored consumer and emitting a pressure signal to the controller;

(ii) generating a control signal by the controller, said control signal being responsive to the pressure signal;

(iii) activating an actuator of the DCV by the control signal, thereby governing the flow rate through the DCV so as to control flow rate through the pilot valve and to obtain desired pressure at the monitored consumer, regardless of altering flow rate through the PRV.

Where the flow parameter is flow rate, the method comprises the additional steps of:

(iv) measuring the flow rate adjacent the PRV and transmitting a flow rate signal to the controller;

(v) converting the flow rate signal into a pressure signal representative of the pressure at the monitored consumer, based on conversion calculations;

(vi) measuring the local pressure at an outlet line of the DCV and generating a corresponding local pressure signal;

(vii) comparing the local pressure signal and the pressure signal and generating a corresponding control signal (viii) returning to step (iii).

It is advantageous that the water supply system be fitted with a bypass gate overriding the DCV such that at the event of malfunction of the system, the bypass opens to thereby provide outlet pressure $P_{out}$ at an outlet of the PRV corresponding with the nominal output pressure set at the pilot valve.

The invention is also concerned with a water supply system which is capable of handling also significantly low flow rates thus avoiding so-called "hunting", namely a situation at which a typical water supply system cannot stabilize its pressure parameters at low flow rates.

Accordingly, there is provided a water supply system comprising a line connected to at least one consumer, a pressure regulation system comprising a high flow rate path and a parallely installed bypassing low flow rate path; said high flow rate path comprising a high flow pressure regulating valve (HFPRV) having a high nominal flow output and associated with a pilot valve preset to a first nominal output pressure; and a pressure control system comprising a controller, a differential control valve (DCV), a pickup unit for measuring flow rate through the system; said low flow rate path comprising a low flow pressure reducing valve (LFPRV) having a low flow nominal output and associated with a pilot valve preset to a second nominal output pressure; wherein said pickup unit emits a flow parameter signal to the controller which generates a responsive control signal to activate an actuator of the DCV to thereby govern the flow rate through the DCV; whereby when the flow parameter signal declines below a preset value, said DCV closes entailing in closing of the HFPRV and simulations opening of the LFPRV; and when the flow parameter exceeds said preset value the LFPRV closes and the HFPRV opens.

Where the flow parameter is flow rate measured before or after the HFPRV, but before or after the branching of the low flow control circuit, respectively, the DCV comprises:

a housing fitted with a static inlet and a dynamic inlet both being in flow communication with an outlet of the pilot valve preset to a high nominal output pressure, and a valve outlet being in flow communication to an outlet of the HFPRV;

a control chamber sealingly partitioned by a flexible diaphragm dividing the chamber into an a first chamber communicating with the static inlet, and a second chamber communicating with the valve outlet and with a controlled flow passage serving to effect communication between said second chamber and said dynamic inlet;

a spring loaded obturating member articulated with the diaphragm and being axially displaceable within the controlled flow passage responsive to differential pressure displacement of the flexible diaphragm; and an actuator controlled by the controller, for axially displacing the obturating member thereby to govern flow through the controlled flow passage responsive to differential pressure over the flexible diaphragm and an opposing force imparted by the spring and the actuator.

BRIEF DESCRIPTION OF THE DRAWINGS

In order to understand the invention and to see how it may be carried out in practice, some preferred embodiments will now be described, by way of non-limiting example only, with reference to the accompanying drawings, in which:

FIGS. 3A to 3C illustrate a differential control valve used in a flow control system in accordance with the present invention, wherein:

FIG. 3A illustrates the valve in a closed position;

FIG. 3B illustrates the valve in a partially open position; and

FIG. 3C illustrates the valve in a completely open position;

DETAILED DESCRIPTION OF THE INVENTION

Figure 1:
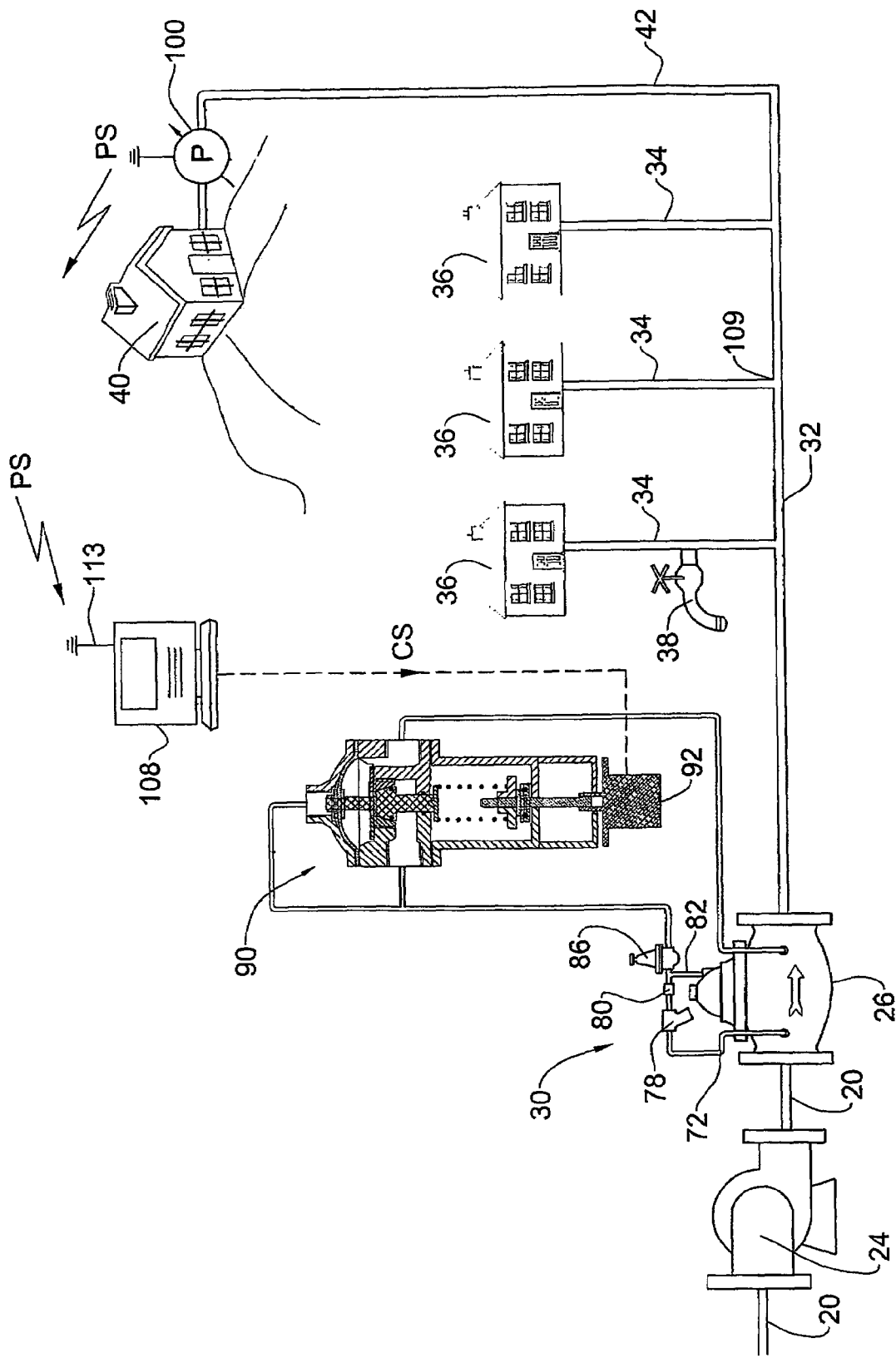
FIG. 1 is a schematic representation of a water supply system in accordance with an embodiment of the present invention.

Attention is first directed to FIG. 1 of the drawings, illustrating by way of a schematic representation, a water supply system in accordance with the present invention which represents a branching portion of a typical municipal water supplying system. The system comprises a network of pipes originating at a source of water, e.g. lake, water reservoir, well, etc. (not shown). Water may be propelled through the pipe network 20 by means of one or more pumping units 24 or other suitable means, as known per se, e.g. gravity, etc. The water flowing through the pipe network is pumped at essentially high pressure until it reaches to branching sections at each neighborhood or block where a pressure reducing valve (PRV) 26 is fitted for reducing pressure of the water as will become apparent hereinafter with more detail also to the control system generally designated 30 illustrated in somewhat more detail in FIG. 2.

It is a concern of the water supplying company (typically municipality, etc.) that all the consumers along a supply line receive at least a certain nominal pressure to thereby ensure proper operation and functioning of various pressure activated equipment, e.g. sprinklers, valve and filtering means, etc. as well as to enjoy reasonable pressure and domestic water facilities, e.g. tap showers, etc. On the other hand, it is a significant concern of the water supplying company that the pressure at the consumers does not exceed a certain nominal pressure so as not to be liable to damages caused by over pressure, e.g. bursting of pipes (typically occurring in solar collectors), significant leaks, etc.

A main pipeline 32 extending from PRV 26 branches off into pipes 34 leading to a network of consumers comprising several houses 36 and a municipal or domestic faucet 38 and a significantly remote consumer designated 40 positioned on top of a hill and connected to the main pipe 32 by pipe line 42. Under normal conditions, the pressure monitored at this latter consumer 40 is lowest, owing to the long pipeline reaching thereto (friction and head loss through coupling and branching elements) and owing to head loss in view of altitude differences. The consumer 40 is referred to as a monitored consumer (at times also referred to as a critical consumer).

Figure 2:
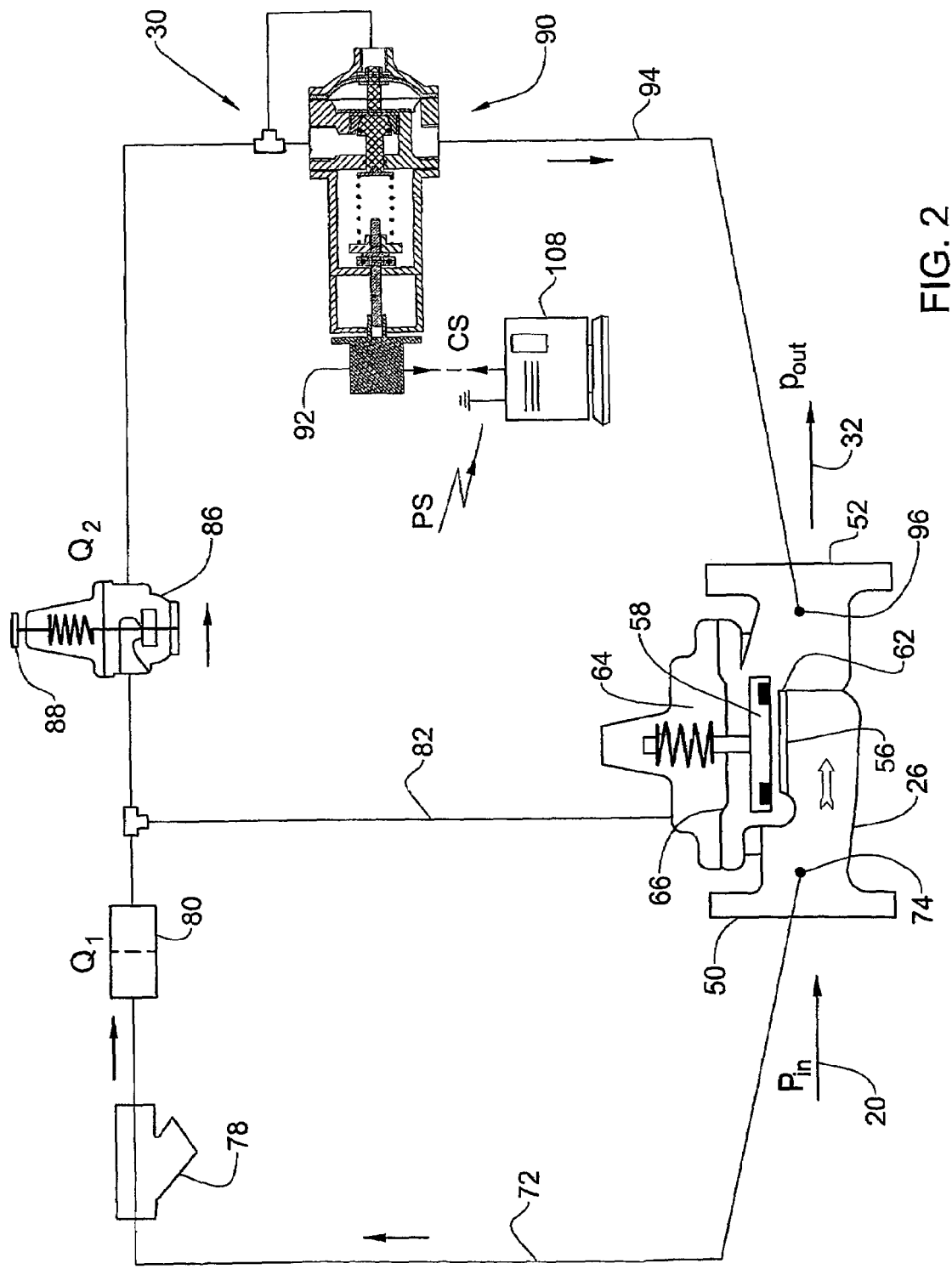
FIG. 2 is a schematic representation showing in somewhat more detail a control system of the water supply system illustrated in FIG. 1.

Further discussion is directed to the control system generally designated 30, with further reference being made also to FIG. 2. The PRV 26 comprises an inlet 50 coupled to an upstream main pipe section 20 and an outlet 52 coupled to a downstream main pipe line 32. A flow passage 56 is formed within the PRV between the inlet 50 and outlet 52 sealable by a valve member 58 sealingly engageable over a valve seating 62. The PRV further comprises a control chamber 64 formed with a flexible diaphragm 66 axially supporting the valve member 58.

The arrangement is such that pressurizing the pressure chamber 64 causes diaphragm 66 to deform downwardly, entailing corresponding displacement of valve member 58 towards valve seating 62, thus restricting or completely closing the flow passage 56. Depressurizing pressure chamber 64 results in axial displacement of valve member 58 to disengage from the valve seating 62 so as to reopen the flow passage 62.

The pressure within the control chamber 64 is governed by the amount of water introduced or drained from the chamber 64. A control bypass line 72 is connected to the PRV upstream at 74 being in flow communication with an inlet pressure $P_{in}$ which corresponds with the upstream pressure. Fitted on the control bypass line 72 there is a filter unit 78 and a flow restriction orifice 80 having a constant flow rate. Extending into the control chamber 64 is a pressure control line 82. Further fitted on the control bypass line 72 there is a pilot valve 86 having a nominal outlet pressure, manually adjustable by screw-type governor 88.

Extending downstream of pilot valve 86 and connected to pipe section 87 there is a differential control valve (DCV) 90 having an outlet coupled to outlet 52 of the PRV 26. The DCV comprises an electrically operated actuator 92. The construction of DCV 90 will be explained in more detail with reference to FIGS. 3 and 5.

The DCV is coupled to the PRV at 96 by pipe section 94 being in flow communication with a downstream portion of main pipe 32 at pressure $P_{out}$.

As can be seen in FIG. 1, a pressure pickup unit 100 is fitted at the site of the monitored consumer 40, said pickup unit 100 comprising a transmitter for transmitting a pressure signal PS receivable by a controller 108. It is appreciated that rather than transmitting the pressure signal PS by wireless communication means, this may be carried out by other means, e.g. wired telecommunications (e.g. telephone lines, electric lines, optical signaling etc.). The control loop closes upon issuing a control signal CS which is responsive to the pressure signal PS and which activates the actuator 92 of the DCV, as will be explained hereinafter in more detail.

A water supply system which is not supported by a closed-loop control system would normally have several pressure drops during the day, as a result of increased consumption typically measured at the morning hours (between about 6 and 9 a.m.) and again in the evening hours (between about 7 and 9 p.m.). However, these peaks are subject to changes, e.g. at weekends, upon setting of DST, season changes, major events such as an important sports match, etc. Each time such a pressure drop is measured, the monitored consumer 40 will experience a rather significant drop in pressure which may have influence on functioning of some household equipment or even effect quality of life. On the other hand, in order to compensate for loss of pressure during critical hours, the system may be programmed such as to avoid pressure drop below a predetermined minimum nominal pressure at said monitored consumer. The outcome of such an arrangement is that at the so-called dead hours of the day, i.e., those hours which water consumption is kept to a minimum (e.g. after midnight and before dawn) consumption is very low and thus minor leaks at the piping, e.g. at connections and couplings, e.g. 109 in FIG. 1, or leaks in domestic or public taps, e.g. faucet 38 will become significant leaks.

The water supply system in accordance with the present invention, as illustrated by one example in FIG. 1, overcomes this problem by continuously monitoring the pressure at the monitored consumer 40 where the minimal nominal pressure is determined. A pressure signal corresponding with the pressure measured at the pressure pickup unit 100 is transmitted and picked up by aerial 113 of the controller 108. Responsive to the pressure signal PS, the controller generates a control signal CS to the actuator 92 of the DCV 90 to thereby open or close a flow path through the DCV 90 such that the PRV 26 is continuously adjusted to provide the desired pressure at the monitored consumer 40, regardless of altering flow rate owing to changes of consumption.

The controller 108 is preprogrammed or programmable so as to control the actuator 92 within preselected ranges of operation so as to not exhaust power source (typically batteries) and to reduce ware of the system occurring by excessive use. Accordingly, it is advantageous that the controller 108 be programmed so as to generate a control signal CS corresponding with a range of pressure signals PS so as to respond only to significant pressure changes for example, a control signal CS would be generated by the controller 108 only when the pressure signal departs from a certain range of value.

Each time a control signal CS is emitted by controller 108, the actuator 92 of DCV 90 changes a flow passage in the DCV to thereby control the amount of water flowing through pipe section 94, i.e. the extent to which the pressure chamber 64 of PRV 26 is pressurized, eventually controlling the outlet pressure $P_{out}$ of PRV 26.

Figure 3A:
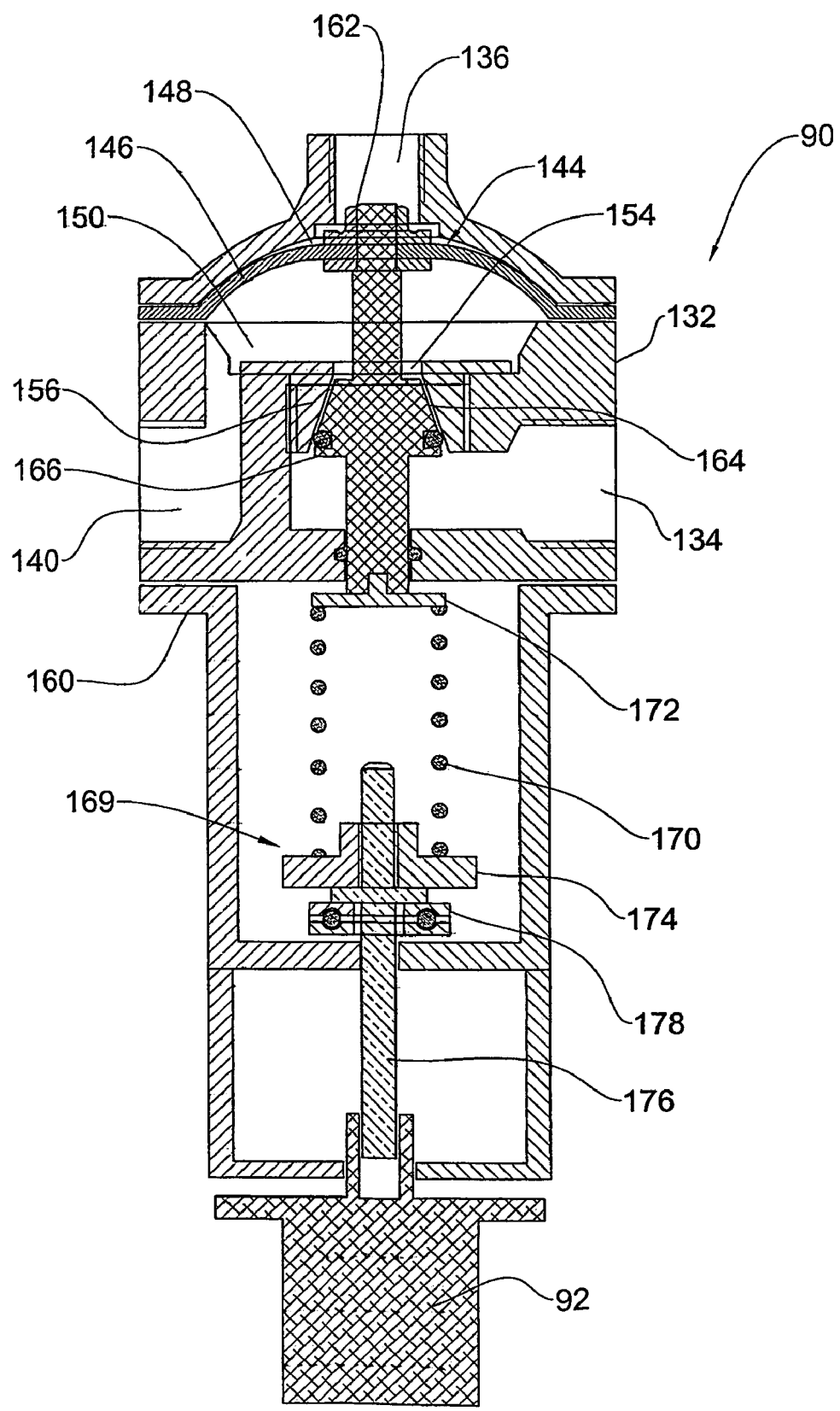
Figure 3B:
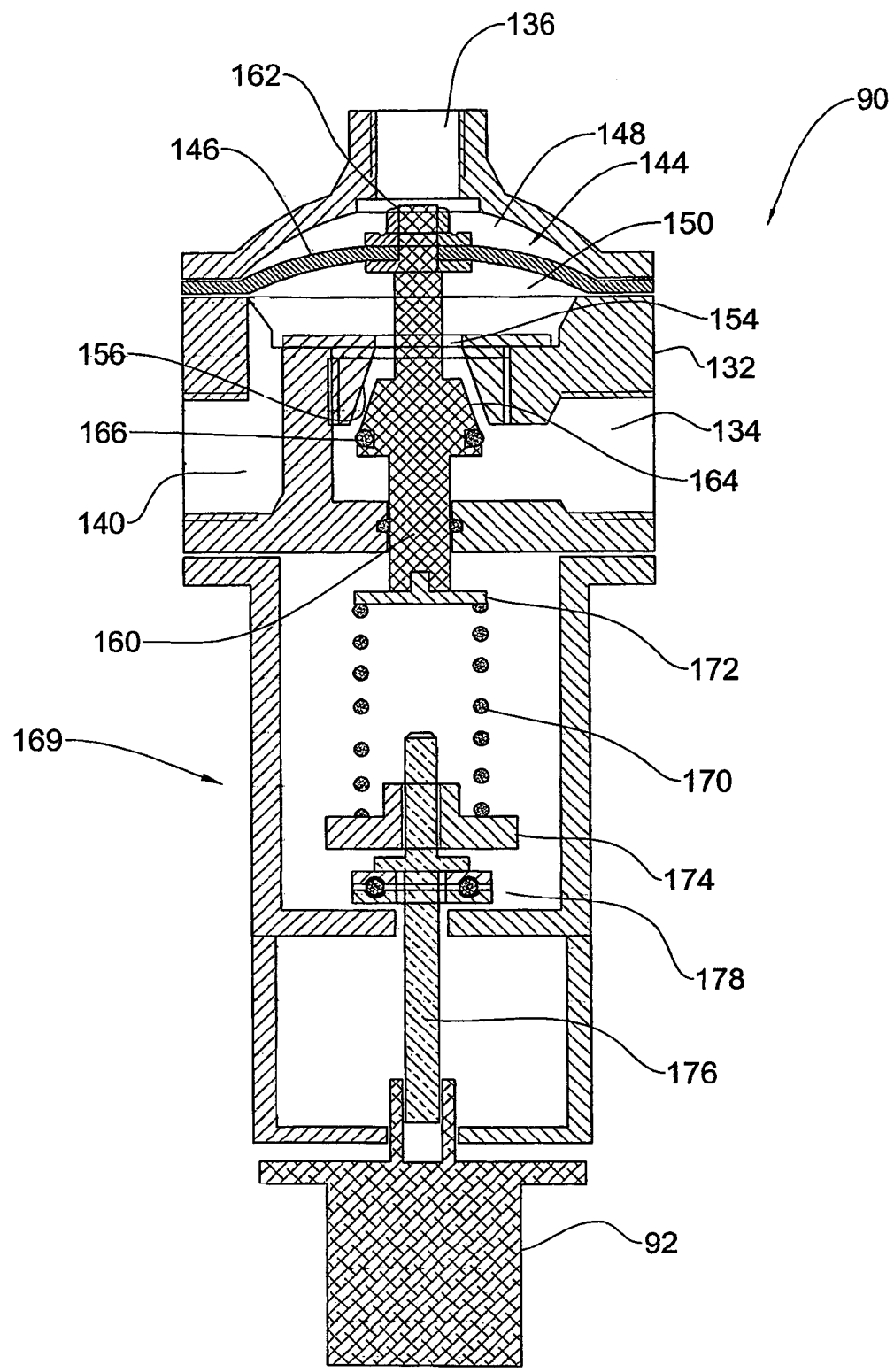
Figure 3C:
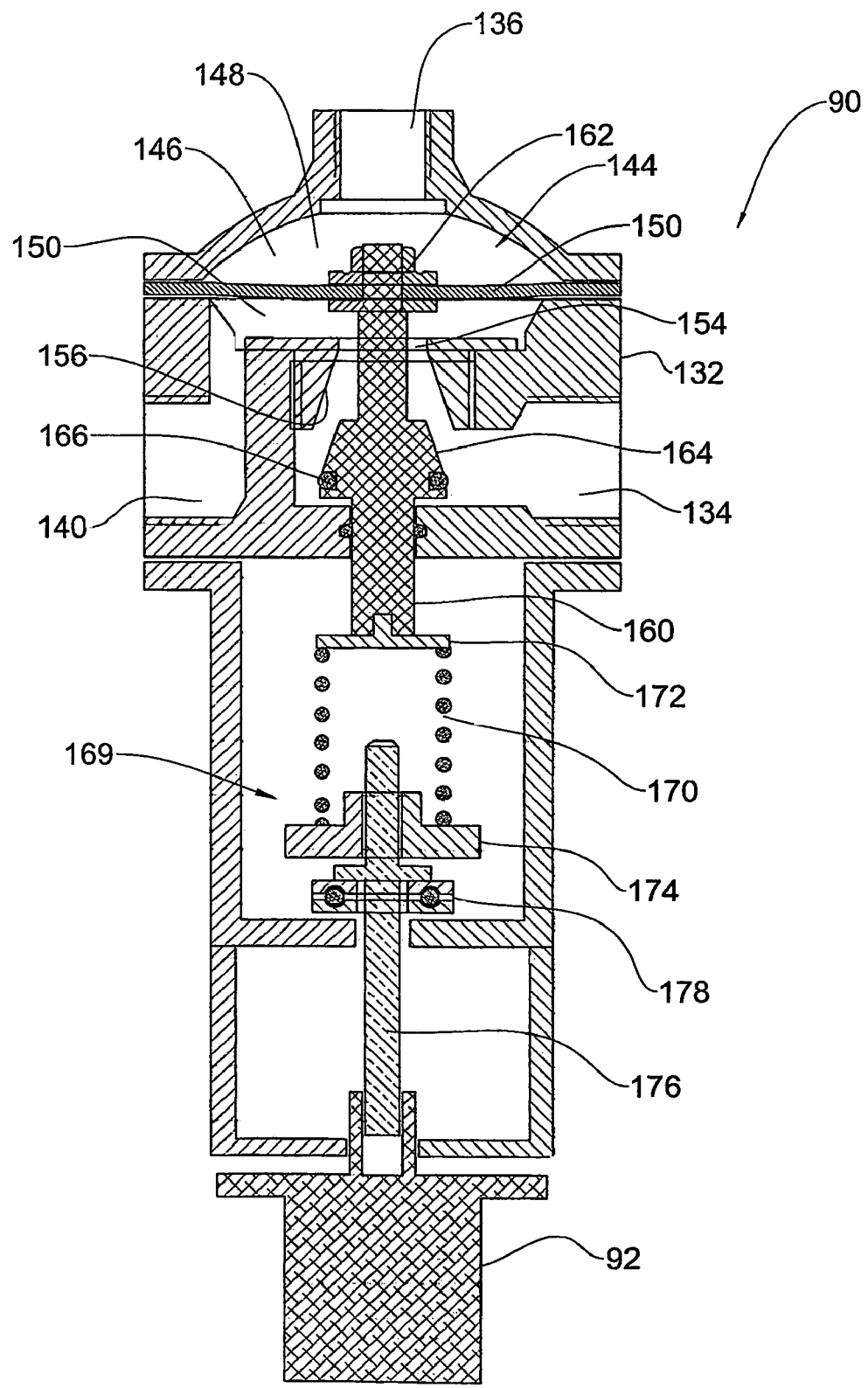

Further attention is now directed to FIGS. 3A to 3C of the drawings concerned with a particular design of the differential control valve (DCV) 90 which is a needle-type valve.

The differential control valve comprises a housing 132 having a static inlet port 136 (which in the configuration of the control system illustrated in FIG. 2 is coupled to pipe section 87) and a dynamic inlet 134 (which in the configuration of a control system of FIG. 2 is also coupled to pipe section 87). Housing 132 is further formed with a valve outlet 140 (which in the configuration of the control system of FIG. 2 is coupled to pipe section 94 extending to the outlet port of PRV 26).

Formed within the DCV 90 there is a control chamber 144 sealingly partitioned by a flexible diaphragm 146 which divides the control chamber into an upper, first chamber 148 being in flow communication with the static inlet 134, and a lower, second chamber 150 being in flow communication with the outlet port 140.

A flow passage 154 is formed with a sealing surface 156. The flow passage 154 communicates between the dynamic inlet 134 and the second chamber 150, and in fact serves to effect communication between the dynamic inlet 136 and the outlet 140. An obturating member 160 is articulated at 162 to diaphragm 146 and comprises a tapering sealing portion 164 corresponding with the tapering sealing seat 156 (best seen in FIG. 3C). An O-ring 166 is provided for complete sealing.

The obturating member 160 is axially displaceable within the flow passage between a completely closed position and open positions in which flow communication is effected between the dynamic inlet 134 and the outlet 140.

The obturating member 160 is normally biased towards sealing engagement (closing) of the flow passage 154 by means of an actuating mechanism 169 comprising a coiled spring member 170 bearing at one end against a support plate 172 fitted at an end of the obturating member 160 and at its opposed end against an axially displaceable plate member 174 fitted on a threaded rod 176 supported by bearing 178 and rotatable by means of actuator 92.

The arrangement is such that the rotation of rod 176 entails axial displacement of plate member 174 to thereby increase or decrease axial force of spring 174, resulting in axial displacement of support plate 172 and respectively of obturating member 160 towards opening or closing flow passage 154. It is however appreciated that both inlet ports, namely static inlet 136 and dynamic inlet 134 are coupled to the same water supply line and are thus equally pressured. Accordingly, the first chamber 148 and the second chamber 150 are equally pressured resulting in that the diaphragm 156 is in a neutral position apart from axial pressure applied by the actuating mechanism 169. Pressure within the second chamber 150 with the force applied by spring 170 converted into pressure, is essentially equal to the pressure in the first chamber 148. The outcome of this arrangement is that the dynamic pressure is differentiated and the actual opening of the flow path is governed by the axial pressure applied by the actuating mechanism 169, namely by the force of spring 170 and the axial displacement imparted by the actuator 92.

Whoever, it should be appreciated that the obturating member 160 may be axially displaced by means other than the actuating mechanism 169, e.g. by a hydraulic actuating mechanism., etc.

In the position of FIG. 3A, the DCV 90 is in its so called closed position wherein sealing portion 164 of the obturating member 160 sealingly engages seat 156 to effectively close the flow passage 154. In FIG. 3B, the DCV 90 is illustrated in a partially opened position wherein the flow passage 154 is opened to some extent to effect communication between the dynamic inlet 134 and the outlet 140, via the second chamber 150. It is appreciated that the corresponding tapering surfaces 156 and 164 give rise to a sufficiently wide flow passage which is less susceptible to blockage by sand, dirt, etc. In the position of FIG. 3C, the DCV 90 is illustrated in a completely open position wherein the plate member 174 is completely retracted and essentially no force is applied by spring 170 to thereby effect maximal flow between the dynamic inlet 134 and the outlet 140.

Figure 4:
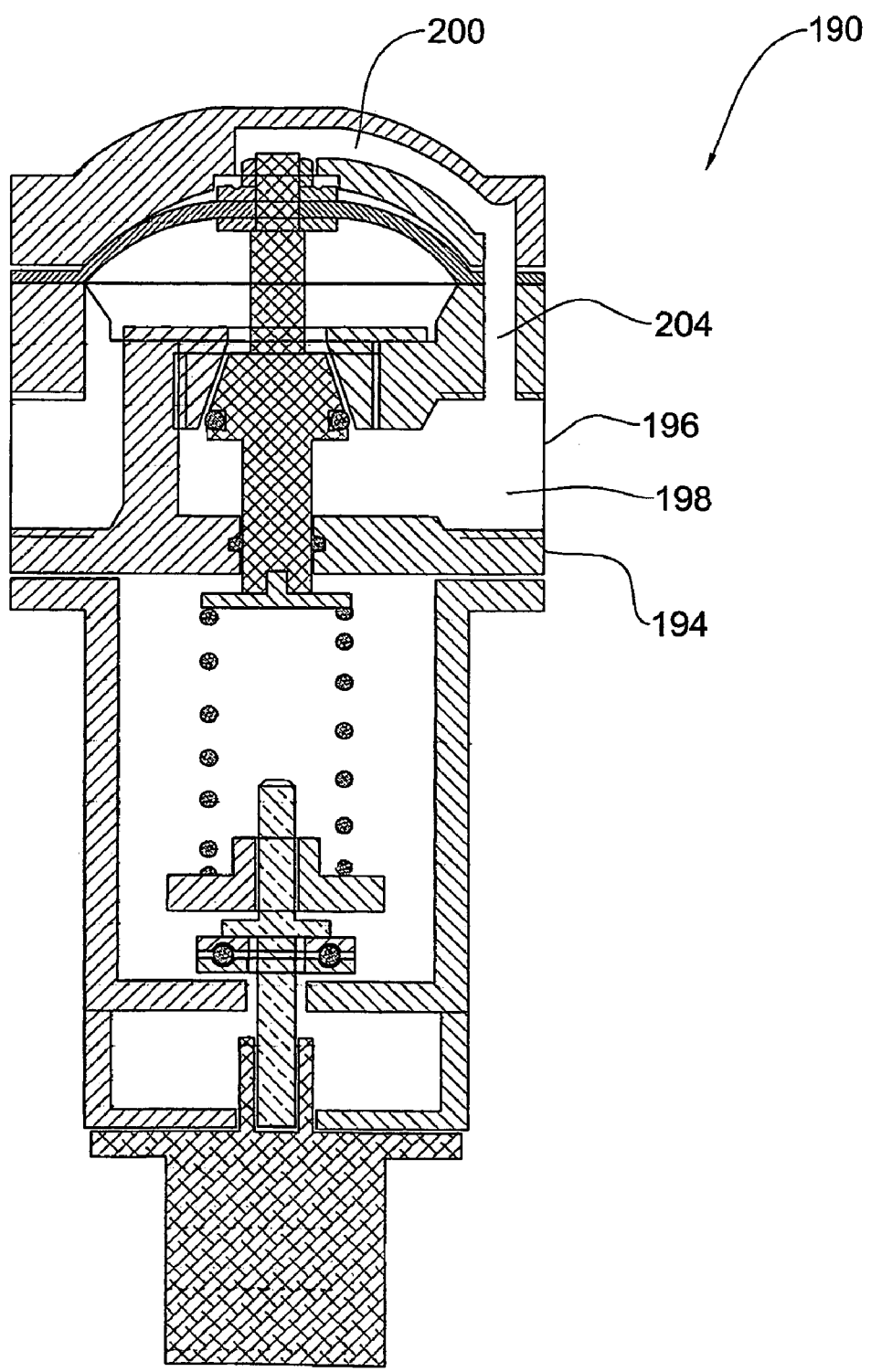
FIG. 4 illustrates an embodiment of a differential control valve in accordance with the present invention, the valve in its closed position.

Further attention is directed to FIG. 4 of the drawings which illustrates a DCV in accordance with an embodiment of the present invention generally designated 190 which is essentially similar in principle to the DCV 90 illustrated in FIGS. 3A–3C, the main difference residing in the construction of the inlet ports. As seen in FIG. 4, the housing 194 comprises a main inlet 196 splitting into a dynamic inlet 198 and a static inlet 200 communicating with the main inlet 196 via duct 204 integral with the housing 194. Other components and construction of the DCV 190 are similar to those disclosed in connection with the DCV 90 illustrated in FIGS. 3A–3C and the rear is directed to the description referring to these figures.

Figure 5:
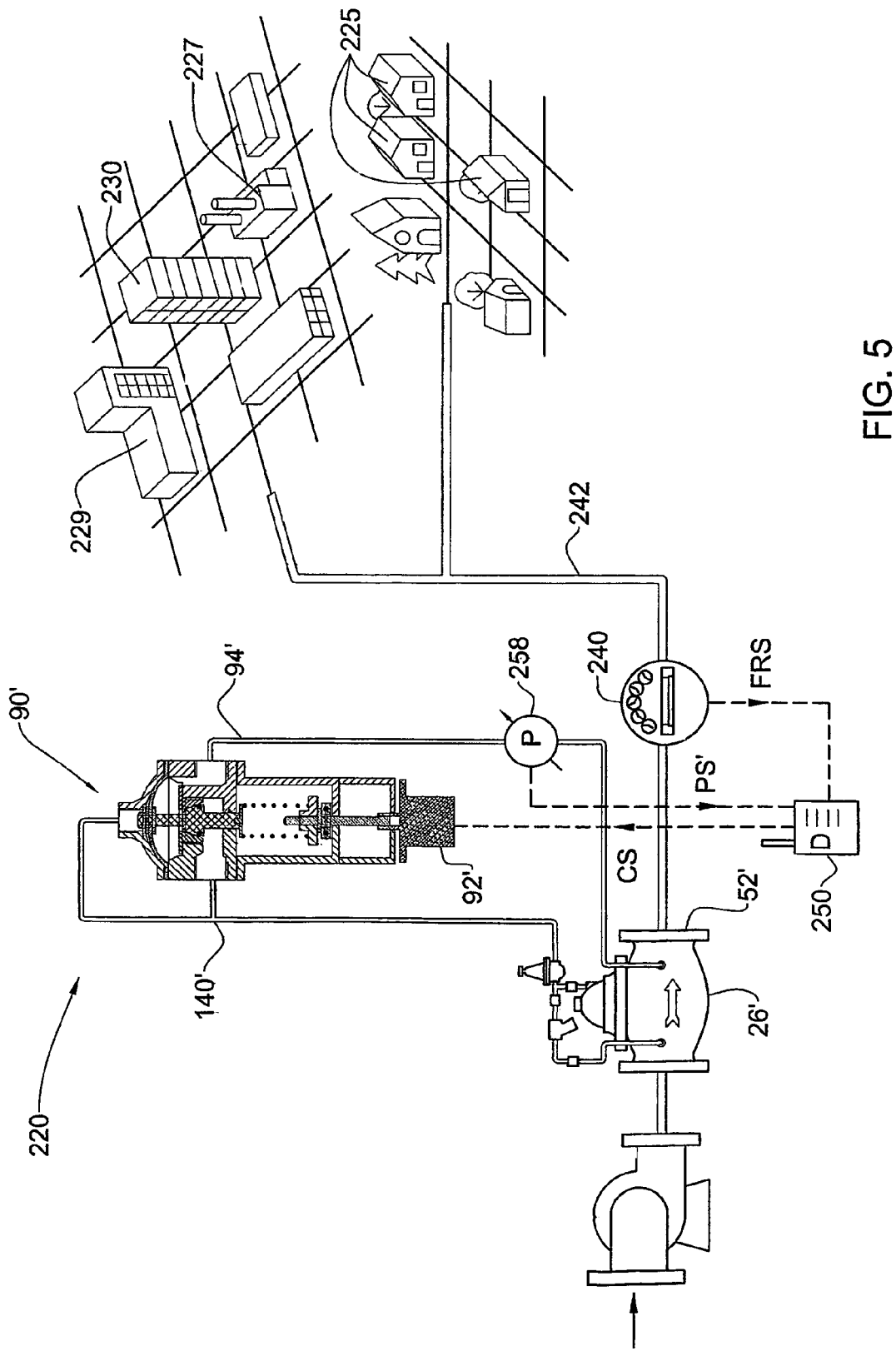
FIG. 5 is a schematic representation of a water supply system in accordance with a different embodiment of the present invention.
Figure 6:
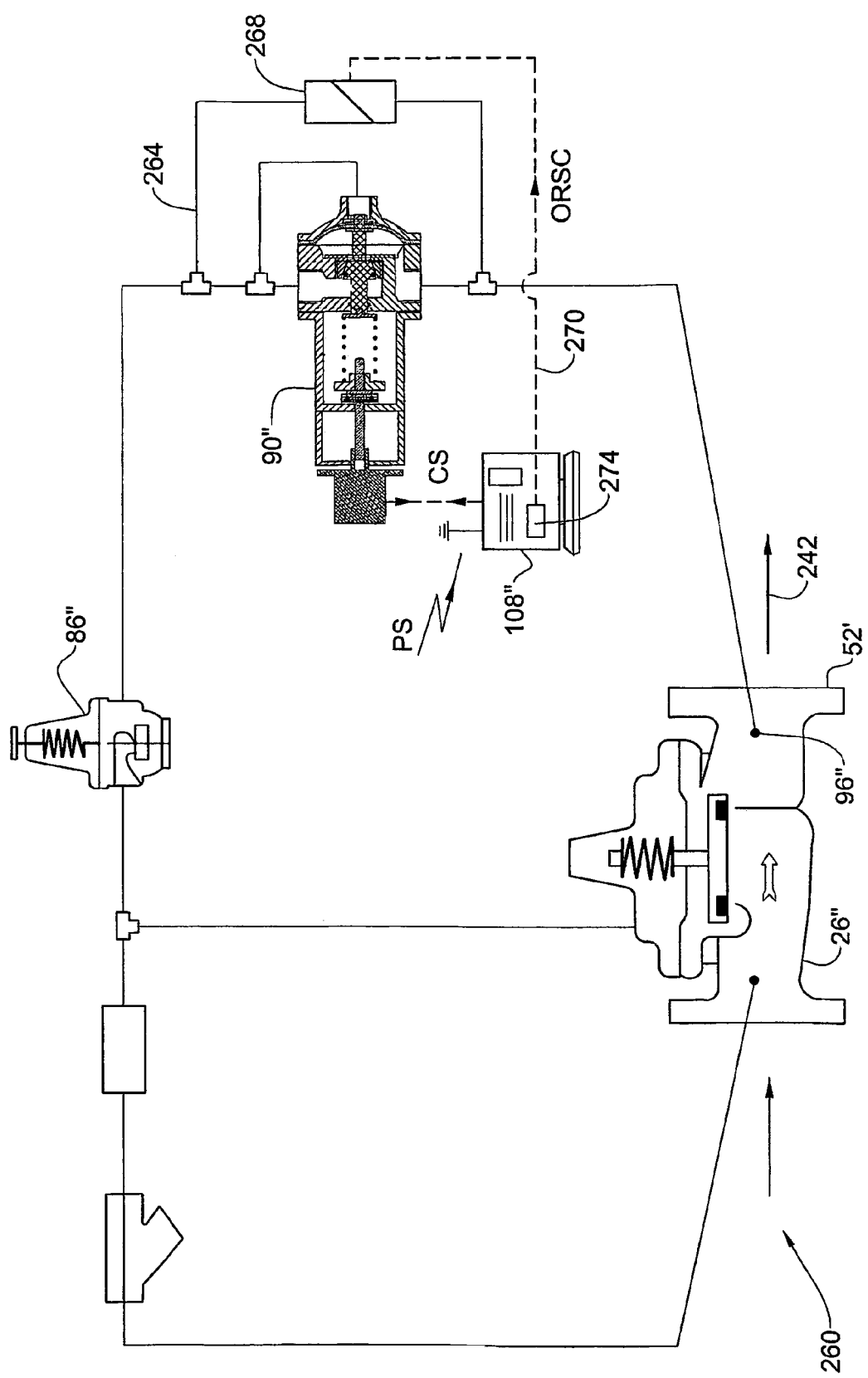
FIG. 6 is a schematic representation of the control system used in a water supply system in accordance with the embodiment of FIG. 5.

Further attention is now directed to FIGS. 5 and 6 illustrating a water supply system in accordance with an embodiment of the present invention. The present embodiment differs from the previous embodiment illustrated with reference to FIGS. 1 and 2, in particular as far as concerned with the control system generally designated 220. Accordingly, elements in the embodiment of FIGS. 5 and 6 which are similar with those of the embodiment depicted in FIGS. 1 and 2 are designated same reference numbers with a prime (') indication.

In the present example water is provided to a suburb of a town supplying water to a plurality of houses 225, some industrial facilities 227 and public facilities 229 e.g. an office building and a skyscraper 230 constituting the so called monitored consumer wherein the pressure measured is lowest.

Unlike in the embodiment of FIG. 1, a flow meter 240 is fitted on a supply line 242 extending from the PRV 26' for measuring a flow parameter which in the present case is a flow rate signal FRS which signal is then transferred to controller 250. The flow rate signal is converted at the controller 250 into a corresponding pressure signal representative of the pressure residing at the monitored consumer 230. This is obtained by conversion calculations which based on experience and measurements convert a flow rate signal into a pressure signal. Responsive to the FRS (and to the pressure signal PS corresponding thereto) a control signal CS is generated at the controller 250 which control signal CS is then directed to actuator 92' of a DCV 90' to thereby activate the actuating mechanism of the DCV 90' as explained hereinbefore with reference to FIGS. 3A–3C.

In addition, a pressure sensor 258 is fitted on line section 94' extending between an outlet 140' of the DCV 90' and the outlet 52' of the PRV 26'. The pressure sensed by pressure meter 258 transmitting a general local pressure signal PS' which is compared with the converted pressure signal obtained by the flow rate signal FRS so as to close the control loop and thereby provide a more accurate control loop.

The arrangement in accordance with the embodiment of FIG. 5 is such that upon increase of flow rate sensed by the flow meter 240, a corresponding flow rate signal FRS is transmitted to controller 250 whereby a corresponding pressure signal is obtained, in response to which a control signal CS is generated by controller 250 so as to actuate the actuator 92' of the DCV 90' to thereby drain the pressure chamber of the PRV 26' to thereby increase flow through the PRV and provide the increased demand, e.g. in peak hours as explained hereinabove.

However, when the flow rate sensed at the flow meter 240 decreases, a corresponding control signal CS is transmitted by controller 250 to the actuator 92' of DCV 90' to thereby close the flow passage thereof whereby the pressure chamber of the PRV 26' is pressured to thereby effect restriction of the flow passage of the PRV 26'.

The embodiment of FIG. 6 illustrates a control system generally designated 260 which comprises the same elements as in the control system 30 of FIG. 2 and thus like elements are designated with same reference numbers distinguished by a double prime indication.

The control system 260 of FIG. 6 comprises an additional bypass gate 264 overriding the DCV 90" with an electrically operated gate 268, typically being a solenoid connected by a control line 270 to the controller 108".

The arrangement is such that when the system senses a faulty position e.g. a broken spring of the DCV or an error in the controller 108", a capacitor 274 fitted in the controller 108" is discharged to activate the solenoid 268, whereby bypass gate 264 opens so as to override the DCV 90". Upon opening of the override gate 264 the DCV 90" becomes inactive whereby the pilot valve 86" is directly connected to outlet 96" of PRV 26".

It is obvious that a bypass gate 264 as illustrated in FIG. 6 may as well be applied on to a control system of the type disclosed with reference to FIG. 5. Furthermore, it is appreciated that rather than activating solenoid 268 by discharging capacitor 274, an override control signal ORCS may be generated by the controller 108" each time some sort of faulty state is sensed. For example, in case of a communication problem where any of the signals is not received or transmitted by the controller, a power failure, a mechanical problem concerned with the DCV (e.g. breakage of spring), software problems, etc. Even more so, rather then a solenoid activated gate, other means may be utilized for opening the gate, such as, for example, hydraulics or pneumatics.

Figure 7:
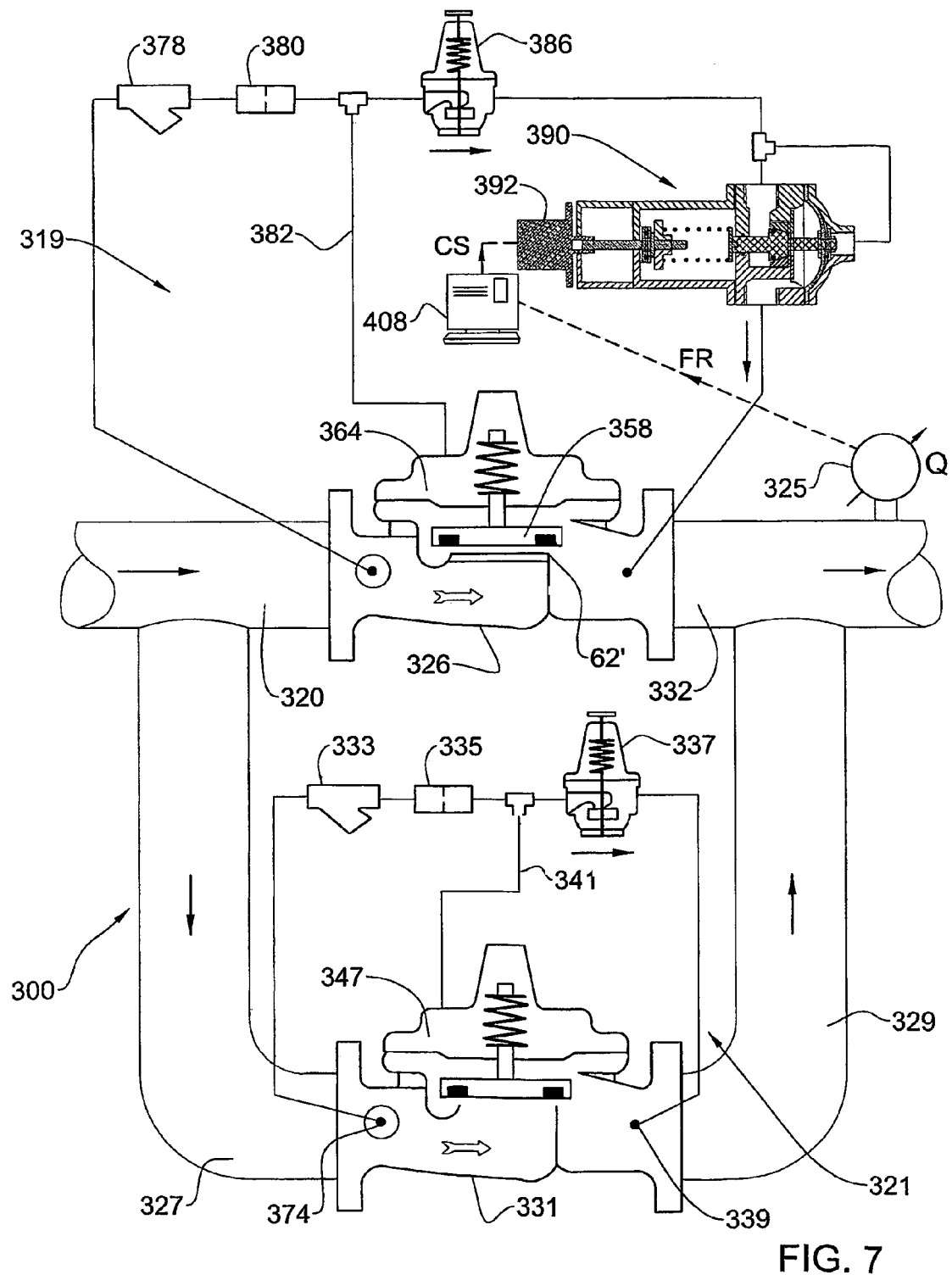
FIG. 7 is a schematic representation of a control system for preventing hunting, in association with a water supply system in accordance with the present invention.

Turning now to FIG. 7, there is illustrated a control system in accordance with a variation of the invention, generally designated 300. In the embodiment of FIG. 7, elements which correspond with elements referred to in FIG. 2 are given same reference numbers shifted by 200. The control system 300 is in particular suited for handling situations referred to in the art as hunting where the flow through supply line 332 is significantly low and where the PRV 326 is not capable of providing stabilized outlet pressure. This occurs in particular since the PRV 326 is designed for handling high flow rates and where insignificant displacement of the valve member 358 with respect to the valve seat 62', renders the device unstable.

This situation is overcome by providing a control system 300 as illustrated in FIG. 7 comprising a high flow control circuit 319 and a low flow control circuit 321. High flow control circuit 319 comprises a high flow pressure regulating valve HFPRV 326 fitted with a control system similar to that disclosed in connection with FIG. 2, i.e. comprising a filter unit 378, a flow restriction orifice 380, a pressure control line 382, a pilot valve 386 and a DCV 390. Controller 408 is provided for governing actuator 392 of DCV 390 and further receives a flow rate signal FR sensed by a flow meter 325 fitted for measuring the total flow through the system. The flow meter 325 may be fitted either before or after the HFPRV 326, but before or after the branching of the low flow control circuit 321, respectively.

The low flow pressure control circuit LFPRV designated 321 is in fact a pipe system overriding the high flow pressure regulating valve HFPRV 326 by a tube section 327 extending from an upstream inlet pipe 320 and an outlet pipe section 329 connected downstream to main supply line 332. A low flow pressure regulating valve LFPRV 331 is fitted along the bypass fitted with the low pressure control circuit 321 comprising similar elements, namely a filtering unit 333, a flow restriction orifice 335 and a pilot valve 337 connected downstream of the LFPRV 331 at 339. Extending between the flow restriction orifice 335 and the pilot valve 337 is a pressure control line 341 connected to the pressure chamber 347 of the LFPRV 331, similar to the arrangement of the high flow pressure control circuit 319 and to the control system generally designated 30 of FIG. 2.

The arrangement in accordance with the embodiment of FIG. 7 is such that the flow rate is continuously monitored by flow meter 325 issuing a flow rate signal FR to the controller 408. Upon detecting that the flow rate has dropped below a minimal threshold, the controller 408 generates a control signal CS to the actuator 392 of the DCV 390 to thereby compress the coiled spring of the DCV thereby closing flow through the DCV 390. As a result, water no longer flows through pilot valve 386 whereby the control chamber 364 of HFPRV 326 is highly pressured to thereby close the flow passage of the HFPRV 326 by valve member 358. As already mentioned, the flow meter 335 may be positioned at any location suitable for measuring the total flow through the system.

As a result, pressure drops at the outlet 339 of LFPRV 331, below the preset pressure at the pilot valve 337, whereby the flow passage therethrough opens to facilitate water flow through the bypass at low flow rate.

The control system 300 returns to its high flow rate circuit, when the flow meter 325 generates a flow rate signal corresponding with a high flow rate signal (preceding a predetermined threshold) to the controller 408 which in turn generates a control signal to actuator 392 of DCV 390 to thereby open its flow passage, resulting in opening of the HFPRV 326 and simultaneously closing the LFPRV 331.

The invention claimed is:

1. A water supply system comprising a supply line and a network of consumers, one of which being a monitored consumer who receives the least amount of pressure, a pressure regulation system comprising a pressure reducing valve (PRV) associated with a pilot valve preset to a nominal output pressure; and a pressure control system comprising a differential control valve (DCV) connected in series to said pilot valve; a pickup unit for measuring a flow parameter indicative of the pressure at the monitored consumer and emitting a pressure signal to a controller; said controller generating a control signal responsive to the pressure signal to activate an actuator of the DCV thereby governing the flow rate through the DCV, so as to obtain desired pressure at the monitored consumer, regardless of altering flow rate through the PRV.

2. A water supply system according to claim 1, wherein the DCV is fitted at an outlet of the pilot valve for controlling flow rate therethrough.

3. A water supply system according to claim 1, wherein an outlet of the DCV is in flow communication with an outlet of the PRV.

4. A water supply system according to claim 1, wherein the flow parameter is monitored all hours of the day and night.

5. A water supply system according to claim 1, wherein the controller is programmed to generate control signals representative of preset ranges of pressure signals.

6. A water supply system according to claim 1, wherein the flow parameter is flow rate measured adjacent the PRV and converted into a pressure signal representative of the pressure at the monitored consumer, based on conversion calculations.

7. A water supply system according to claim 6, further comprising a pressure pickup for reading pressure at an outlet line of the DCV to generate a local pressure signal, whereby said local pressure signal and the pressure signal are compared at the controller.

8. A water supply system according to claim 1, wherein the flow parameter is pressure measured at the monitored consumer.

9. A water supply system according to claim 8, wherein the pressure signal is transmitted to the controller by wireless communication means.

10. A water supply system according to claim 1, wherein the DCV is fitted intermediate an outlet port of the pilot valve and an outlet port of the PRV.

11. A water supply system according to claim 1, wherein the pressure at the outlet of the DCV does not exceed the nominal output pressure preset at the pilot valve.

12. A water supply system according to claim 1, wherein the DCV is an integrated dynamic differential needle-type valve.

13. A water supply system according to claim 1, wherein the pressure control system is a closed-loop type control system, wherein pressure changes at an outlet of the DCV are continuously monitored and compared with the pressure signal.

14. A water supply system according to claim 1, further comprising an bypass gate for overriding the DCV upon detection of a faulty state occurring at any of the controller and DCV.

15. A water supply system according to claim 14, wherein the bypass gate is activated into an open position by an override control signal emitted by the controller.

16. A water supply system according to claim 15, wherein the bypass gate is opened by a solenoid and where the controller comprises a capacitor which is designed to discharge and activate the solenoid in case of detecting failure in the actuator or controller.

17. A method for controlling pressure at water supply system comprising a supply line and a network of consumers, one of which being a monitored consumer who receives the least amount of pressure; a pressure regulation system comprising a pressure reducing valve (PRV) fitted with a pilot valve preset to a nominal output pressure, a pressure control system comprising a differential control valve (DCV) connected in series to said pilot valve, a flow parameter pickup unit and a controller;

the method comprising the following steps:
(i) measuring a flow parameter indicative of the pressure at the monitored consumer and emitting a pressure signal to the controller;
(ii) generating a control signal by the controller, said control signal being responsive to the pressure signal;
(iii) activating an actuator of the DCV by the control signal, thereby governing the flow rate through the DCV so as to control flow rate through the pilot valve and to obtain desired pressure at the monitored consumer, regardless of altering flow rate through the PRV.

18. A method according to claim 17, wherein the DCV is fitted intermediate an outlet port of the pilot valve and an outlet port of the PRV.

19. A method according to claim 17, wherein the flow parameter is flow rate, the method comprises the additional steps of:
(iv) measuring the flow rate adjacent the PRV and transmitting a flow rate signal to the controller;
(v) converting the flow rate signal into a pressure signal representative of the pressure at the monitored consumer, based on conversion calculations;
(vi) measuring the local pressure at an outlet line of the DCV and generating a corresponding local pressure signal;
(vii) comparing the local pressure signal and the pressure signal and generating a corresponding control signal
(viii) returning to step (iii).

20. A method according to claim 17, wherein the water supply system is fitted with a bypass gate overriding the DCV whereby at the event of malfunction of the system, the bypass opens to thereby provide outlet pressure $P_{out}$ at an outlet of the PRV corresponding with the nominal output pressure set at the pilot valve.

21. A method according to claim 20, wherein the bypass gate is a solenoid activated valve and where the solenoid is activated by a control signal emitted by the controller.

* * * * *